United States Patent
Shimizu

(10) Patent No.: US 10,042,138 B2
(45) Date of Patent: Aug. 7, 2018

(54) PROJECTOR WITH PROJECTION LENS HAVING LENS BARREL WITH HOLLOW STRUCTURE

(71) Applicant: FUJIFILM Corporation, Tokyo (JP)

(72) Inventor: Hitoshi Shimizu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/696,815

(22) Filed: Sep. 6, 2017

(65) Prior Publication Data

US 2017/0363836 A1 Dec. 21, 2017

Related U.S. Application Data

(63) Continuation of application No. PCT/JP2016/052505, filed on Jan. 28, 2016.

(30) Foreign Application Priority Data

Mar. 31, 2015 (JP) .................................. 2015-071425

(51) Int. Cl.
*G03B 21/14* (2006.01)
*G02B 7/02* (2006.01)
(Continued)

(52) U.S. Cl.
CPC ............... *G02B 7/028* (2013.01); *G02B 7/02* (2013.01); *G02B 7/021* (2013.01); *G02B 13/16* (2013.01);
(Continued)

(58) Field of Classification Search
CPC .......... G02B 13/16; G02B 7/02; G02B 7/021; G02B 7/028; G03B 21/00; G03B 21/14;
(Continued)

(56) References Cited

U.S. PATENT DOCUMENTS

2006/0007556 A1* 1/2006 Okajima ............... G02B 7/028
 359/649
2008/0123109 A1* 5/2008 Iwasaki .................. G01B 11/25
 356/610
(Continued)

FOREIGN PATENT DOCUMENTS

JP 2000-187143 A 7/2000
JP 2004-82166 A 3/2004
(Continued)

OTHER PUBLICATIONS

International Search Report for PCT/JP2016/052505 dated Apr. 5, 2016.
(Continued)

*Primary Examiner* — Sultan Chowdhury
*Assistant Examiner* — Magda Cruz
(74) *Attorney, Agent, or Firm* — Birch, Stewart, Kolasch & Birch, LLP

(57) ABSTRACT

A projection lens has lens holding frames that hold lenses. In a case where an image forming panel is disposed to be shifted with respect to an optical axis of the projection lens, an increase in temperature of a first part on a side to which the image forming panel is shifted with respect to the optical axis L, is greater than that of a second part on the opposite side. A hollow structure, which makes the first part 36f and the second part 36g communicate with each other, has a porous layer and is filled with a heat storage medium. By circulating the heat storage medium through the inside of the hollow structure, the first part is cooled, and the second part is heated. Therefore, temperature distribution in the circumferential direction of the lens barrel becomes uniform, and deterioration in performance of the projected image is suppressed.

20 Claims, 5 Drawing Sheets

(51) Int. Cl.
    *G03B 21/20*     (2006.01)
    *G02B 13/16*     (2006.01)
    *G03B 21/00*     (2006.01)
    *H04N 5/74*     (2006.01)
    *G03B 21/16*     (2006.01)

(52) U.S. Cl.
    CPC ............ *G03B 21/00* (2013.01); *G03B 21/14* (2013.01); *G03B 21/16* (2013.01); *G03B 21/2013* (2013.01); *G03B 21/2033* (2013.01); *H04N 5/74* (2013.01); *G03B 21/2066* (2013.01)

(58) Field of Classification Search
    CPC ............ G03B 21/2013; G03B 21/2033; G03B 21/2066; H04N 5/74

See application file for complete search history.

(56) References Cited

U.S. PATENT DOCUMENTS

| 2011/0234989 A1 | 9/2011 | Kudo | |
| 2016/0025954 A1* | 1/2016 | Sakai | G03B 21/14 |
| | | | 353/97 |

FOREIGN PATENT DOCUMENTS

| JP | 2008-58654 A | 3/2008 |
| JP | 2008-58661 A | 3/2008 |
| JP | 2009-92817 A | 4/2009 |
| JP | 2010-243542 A | 10/2010 |
| JP | 2011-209393 A | 10/2011 |
| JP | 2014-78572 A | 5/2014 |

OTHER PUBLICATIONS

Written Opinion of the International Searching Authority for PCT/JP2016/052505 dated Apr. 5, 2016.

* cited by examiner

PROJECTOR WITH PROJECTION LENS HAVING LENS BARREL WITH HOLLOW STRUCTURE

CROSS-REFERENCE TO RELATED APPLICATIONS

This application is a Continuation of PCT International Application No. PCT/JP2016/052505 filed on Jan. 28, 2016, which claims priority under 35 U.S.C § 119(a) to Japanese Patent Application No. 2015-071425 filed on Mar. 31, 2015. Each of the above application(s) is hereby expressly incorporated by reference, in its entirety, into the present application.

BACKGROUND OF THE INVENTION

1. Field of the Invention

The present invention relates to a projector, and particularly relates to a projector in which an image forming panel is fixed in a state where the panel is shifted.

2. Description of the Related Art

Projectors modulate light, which is emitted from a light source, in accordance with an image by an image forming panel (light modulation panel) so as to form image light, and project the formed image light onto a screen through a projection lens. For example, a liquid crystal display (LCD) or a digital micromirror device (DMD) is used as the image forming panel. Further, in the projectors, in order to improve image quality of the projected image, stops are arranged in the illumination optical system and the projection lens, and rays not contributing to image formation are removed.

In recent projectors, due to improvement of various image forming panels and light sources such as LCDs and DMDs, an illuminance of an image, which is projected, has been increased as compared with the related art. An amount of heat generated by the high-intensity light source, which is used in the projector, is extremely large, and the temperatures of various components inside a casing tend to increase.

In the projector described in JP2010-243542A, a duct portion, which is disposed along the outer periphery of an aberration correction lens, is provided in a lens holding frame that holds the aberration correction lens of the projection lens, and a liquid is flowed in the duct portion, thereby cooling the lens holding frame and the aberration correction lens. In addition, the present invention is not limited to the projector, as a technique for cooling the lens and the lens holding frame of the optical device, a flow path is provided around the lens and on the surface of the lens, and cooling is performed by flowing a liquid through the flow path (refer to, for example, JP2000-187143A). Furthermore, there are provided a pipe section through which a liquid flows, a plurality of temperature control blocks which house the pipe section and are arranged around the lens holding frame with the same angular intervals, a control device that adjusts intervals between the temperature control blocks and the lens holding frame), and a plurality of temperature sensors which are provided at angle positions the same as those of the temperature control blocks and measure a temperature of the lens holding frame. A temperature difference in the lens in the circumferential direction thereof may be controlled to be uniform by adjusting the intervals between the temperature control blocks and the lens holding frame so as to decrease temperature differences between temperature sensors having high measurement values and temperature sensors having low measurement values (for example, refer to JP2014-78572A).

SUMMARY OF THE INVENTION

In a case where the optical axis of the projection lens is perpendicular to a screen, an image, which is displayed on the image forming panel, is directly projected onto the screen in an enlarged manner. However, for example, in most cases of a table installation type projector, the screen is disposed above the projector. In particular, there is a merit that it is difficult for the presenter to shadow the front of the screen or the space saving. Thus, there is a demand for a wide-angle type projector in which the distance between the projector and the screen to be projected is set to be short. In such a projector, the image forming panel is disposed to be shifted in a direction opposite to a direction in which the screen is shifted with respect to the optical axis of the projection lens. The amount of shift of the image forming panel increases as an angle of view of the projection lens of the projector becomes wide.

In a case where the image forming panel is shifted in the direction perpendicular to the optical axis of the projection lens and image light is projected onto the screen, rays, which are deviated in the direction in which the image forming panel is shifted from the center of the optical axis of the projection lens, pass through the lens. It can be seen that the temperature increases at the position, at which the light passes, in the projection lens. Hence, in the lens barrel of the projection lens, temperature distribution is generated such that the temperature of the lens barrel on a side to which the image forming panel is shifted becomes relatively higher than the temperature of the lens barrel on the opposite side. Due to the uneven temperature distribution with respect to the optical axis, a part of the lens barrel or a member holding the lens is deformed, and a plurality of lenses constituting the projection lens or a part of the lenses thereof is tilted or displaced. In a case where the lenses are tilted, the optical performance of the projection lens changes from the design value. Thus, this change may deteriorate the quality of the image projected onto the screen.

In JP2010-243542A, JP2000-187143A, and JP2014-78572A, a liquid is flowed in or around the lens holding frame, and the lens is cooled. However, as in JP2010-243542A, JP2000-187143A, and JP2014-78572A, in order to flow the liquid which cools the lens and the lens holding frame, it is necessary to provide a liquid circulation device such as a pump outside the lens barrel. Further, in JP2014-78572A, a block control device, which moves the temperature control blocks, is provided. Accordingly, in a case where those are provided, the size of the entire projector is increased.

The present invention has been made in consideration of such a situation. An object of the present invention is to provide a projector which is capable of suppressing deterioration in quality of an image to be projected by eliminating uneven temperature distribution in a circumferential direction of a lens barrel as a direction perpendicular to an optical axis of a projection lens without an increase in size thereof.

In order to achieve the object, a projector of the present invention comprises:

a projection lens that has a lens and a lens barrel holding the lens;

an image forming panel that is disposed such that a center thereof is shifted with respect to an optical axis of the projection lens and that forms an image;

a light source that irradiates the image forming panel with light;

a hollow structure that makes a first part and a second part of the lens barrel communicate with each other, where the first part is a part of the lens barrel on a side to which the image forming panel is shifted with respect to the optical axis of the projection lens, and the second part is a part of the lens barrel on a side opposite to the first part in the optical axis of the projection lens; and a heat storage medium that is filled and sealed in the hollow structure.

It is preferable that a shape of the side surface of the hollow structure close to the optical axis in a cross section, which is parallel to the optical axis, has a concave-convex shape. Alternatively, it is preferable that a shape of the side surface of the hollow structure close to the optical axis in a cross section, which is orthogonal to the optical axis, has a concave-convex shape.

It is preferable that a porous layer is provided inside the hollow structure. It is preferable that the projector further comprises a cylinder that is provided at the lens barrel, and the hollow structure is formed inside the cylinder. It is preferable that the cylinder is disposed inside the lens barrel.

It is preferable that the lens barrel is made of synthetic resin. It is preferable that the first part and the second part are located to be closer to the image forming panel than a position of a stop which determines an F number of the projection lens.

It is preferable that in a case where a distance from the optical axis to a center of the image forming panel is Y, a length of the image forming panel in a direction of shift is H, and an amount of shift of the image forming panel, which is obtained by dividing the distance Y by the length H, is set as S=Y/H, the amount of shift S is in a range of 0.4<S<0.7. It is preferable that a direction of shift of the image forming panel with respect to the optical axis of the projection lens is a direction of gravity on the basis of the optical axis.

According to the present invention, by using the heat storage medium which is filled and sealed in the hollow structure defining a cavity of the lens barrel and making the first part and the second part communicate with each other, temperature distribution of the projection lens in the circumferential direction of the lens barrel is made to be uniform without an increase in size thereof. Further, it is possible to suppress deterioration in quality of the projected image, which is caused by lens barrel distortion and deviation of the positions or angles of the lens from the design values.

DESCRIPTION OF THE PREFERRED EMBODIMENTS

First Embodiment

Figure 1:
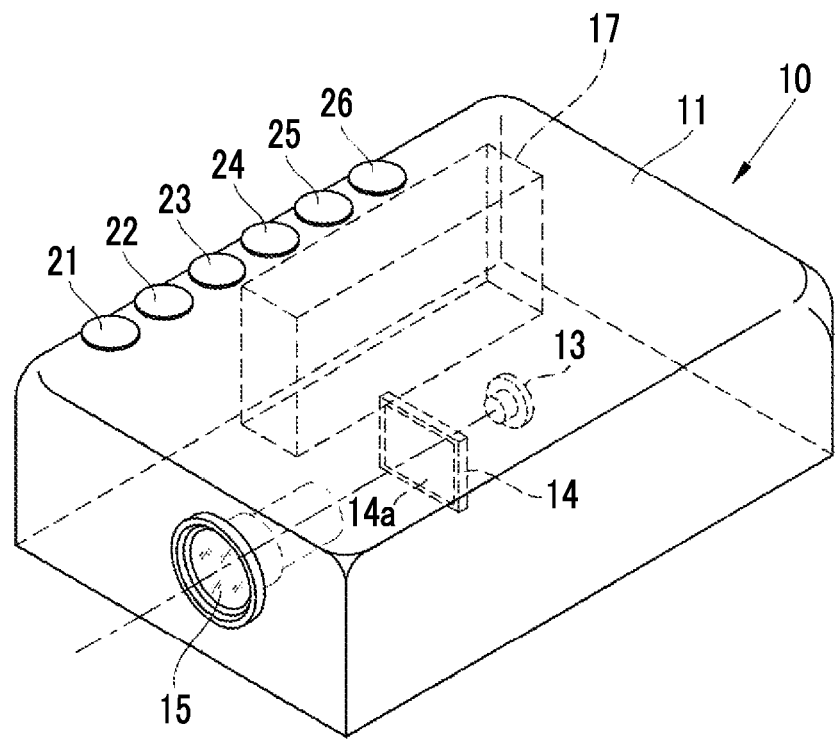
FIG. 1 is a perspective view illustrating a schematic configuration of a projector of the present invention.

As shown in FIG. 1, in a projector 10 of the present embodiment, a casing 11, which has a substantially rectangular parallelepiped shape, houses a light source 13, an image forming panel 14, a projection lens 15, and a control section 17. A zoom dial 21, a light amount adjustment dial 22, a focus dial 23, a vertical focus adjustment dial 24, a horizontal focus adjustment dial 25, and a screen adjustment dial 26 are provided on the casing 11. The light, which is emitted from the light source 13, is modulated in accordance with information about an image on the image forming surface 14a of the image forming panel 14. The modulated light (image light) is incident into the projection lens 15, is emitted from the projection lens 15, and is projected onto a screen (not shown in FIG. 1, and indicated by the reference numeral 20 in FIG. 3). Further, in the following embodiment, a situation, in which the projector is installed on a board such as a table, will be described as an example.

Figure 2:
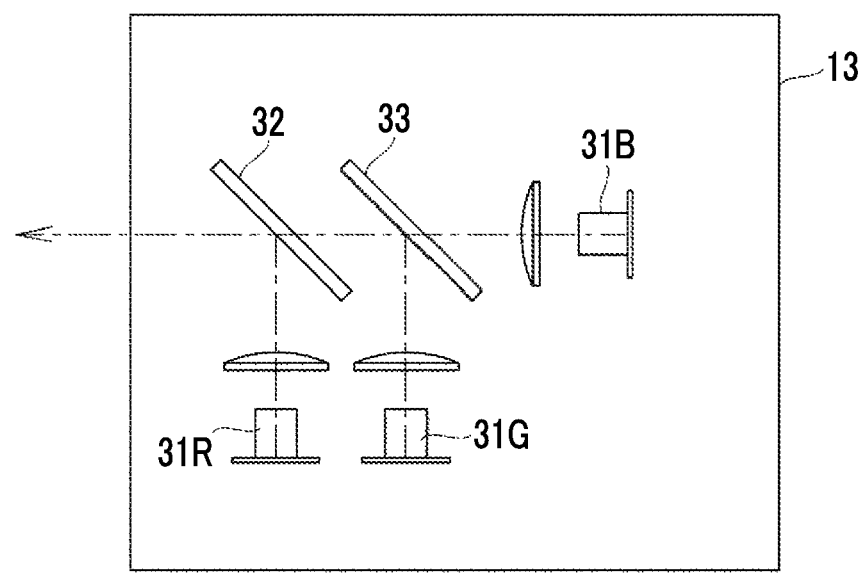
FIG. 2 is a schematic diagram of a light source.

As shown in FIG. 2, the light source 13 has light emitting diodes (LEDs) 31R, 31G, and 31B which respectively emit light beams with three colors such as red (R), green (G), and blue (B). The light, which is emitted from the LED 31R of the R light source, is reflected by the dichroic mirror 32, and the light, which is emitted from the LED 31G of the G light source, is reflected by the dichroic mirror 33, and is transmitted through the dichroic mirror 32. The light, which is emitted from the LED 31B of the B light source, is transmitted through the dichroic mirrors 32 and 33, and the light beams with three colors such as RGB are emitted onto the optical axis.

The control section 17 sequentially displays images with three colors such as RGB on the image forming surface 14a of the image forming panel 14, and performs control for emitting respective light beams from the LEDs 31R, 31G, and 31B of the light source 13 in synchronization with the three-color images. Further, the control section 17 also performs the following processing. For example, in a case of receiving an operation signal of the zoom dial 21, a size of the image projected onto the screen 20 is adjusted. In a case of receiving an operation signal of the light amount adjustment dial 22, a brightness of the image projected onto the screen 20 is adjusted. In a case of receiving an operation signal of the focus dial 23, a focus adjustment mechanism (not shown) of the projection lens 15 is operated to adjust the focus of the central portion of the image projected onto the screen 20. In a case of receiving an operation signal of the vertical focus adjustment dial 24, a first motor of an attitude adjustment device (not shown) is rotated. Thereby, the projection lens 15 is rotated about a horizontal axis perpendicular to the optical axis, and the tilt of the projection lens 15 in the vertical direction is adjusted. In a case of receiving an operation signal of the horizontal focus adjustment dial 25, the second motor of the posture adjustment device is rotated. Thereby, the projection lens 15 is rotated about the vertical axis orthogonal to the optical axis, and the tilt of the projection lens 15 in the horizontal direction is adjusted. In a case of receiving an operation signal of the screen adjustment dial 26, a vertical display size of the image formed on the image forming surface 14a of the image forming panel 14 is changed. For example, the vertical display size is changed such that the rectangular image is not displayed as a trapezoidal image in accordance with the tilt angle of the projection lens 15.

As the image forming panel 14, it is possible to use a transmissive liquid crystal panel, or a digital micro mirror device. Further, the light source 13 may be a xenon lamp or a halogen lamp which emits white light instead of an LED which sequentially emits light with three colors such as RGB. In this case, a transmissive color liquid crystal panel is used as the image forming panel 14.

Figure 3:
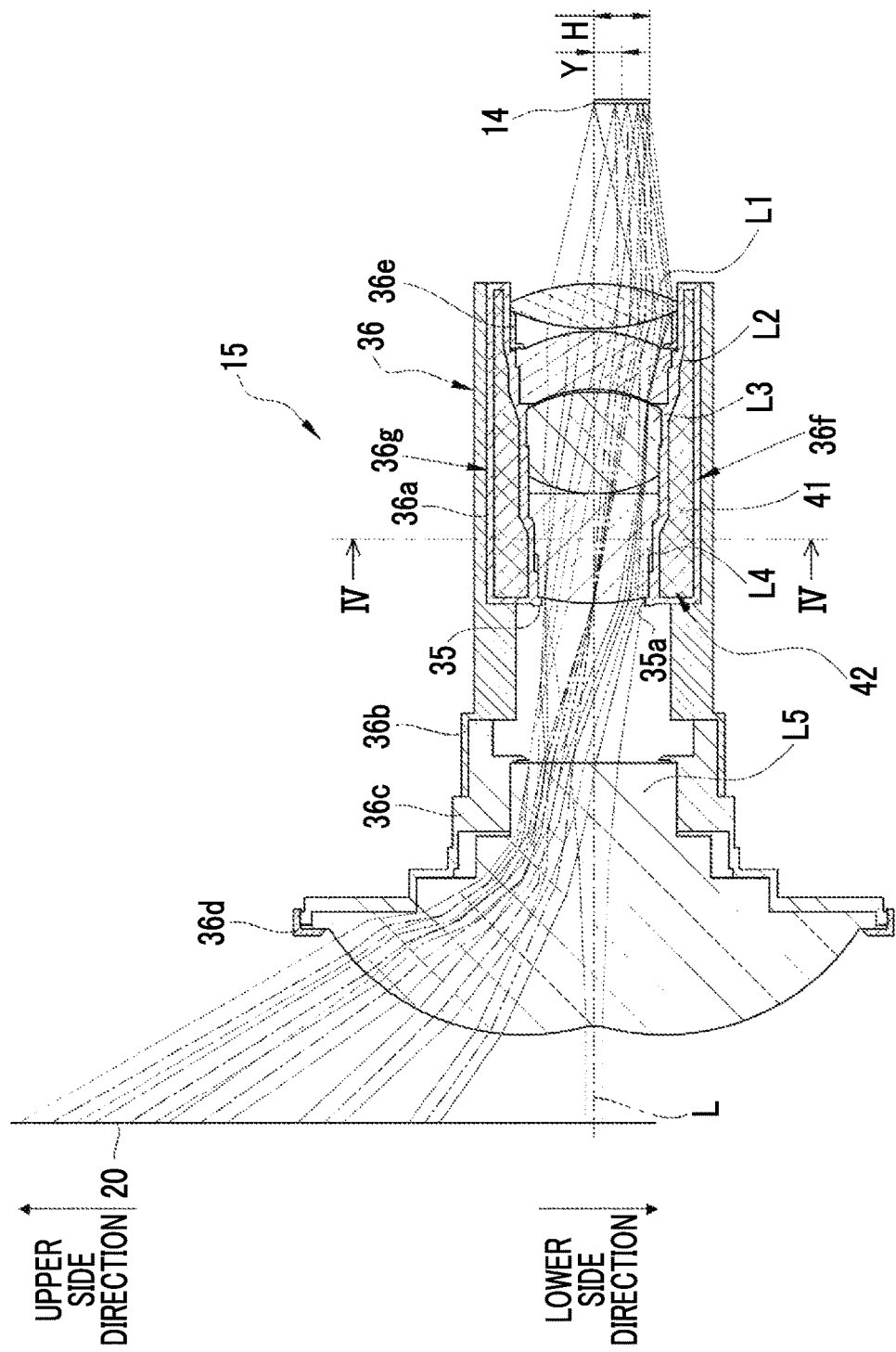
FIG. 3 is a vertical cross-sectional view illustrating a projection lens of a first embodiment.

As shown in FIG. 3, the images are projected onto the screen 20 shifted upward with respect to an optical axis L of the projection lens 15. The center of the image forming panel 14 is fixed in a state where the center is shifted vertically downward with respect to the optical axis L of the projection lens 15, that is, in a direction opposite to the direction in which the central position of the projected image (projection surface of the screen 20) is deviated with respect to the optical axis L of the projection lens 15. As described above, the projector 10 is installed on a board such as a table, and thus a direction of shift of the image forming panel 14 with respect to the optical axis of the projection lens 15 is a direction of gravity on the basis of the optical axis L.

The amount of shift of image forming panel 14 will be described with respect to FIG. 3. Assuming that a distance from the optical axis L of the projection lens 15 to the center of the image forming panel 14 is Y and a length of the image forming panel 14 in the direction of shift is H, an amount of shift S (shift amount) of the image forming panel 14 is defined by S=Y/H which is calculated by dividing the distance Y by the length H. That is, in a case where S=0.5, as shown in FIG. 3, the end face closer to the optical axis L of the image forming panel 14 coincides with the optical axis L of the projection lens 15. Further, in a case where S>0.5 (S is larger than 0.5), the end face closer to the optical axis L of the image forming panel 14 is shifted in a direction of separation from the optical axis L of the projection lens 15. In a case where S=0, the center of the image forming panel 14 coincides with the optical axis L of the projection lens 15, and thus the arrangement is similar to that of the conventional long distance projection type.

It is preferable that the amount of shift S of the image forming panel 14 is greater than 0.4 and less than 0.7. In a case where the amount of shift S is greater than 0.4, the effect of the temperature distribution in the vertical direction of the projection lens 15 becomes ignorable as compared with the case where the amount is equal to or less than 0.4. On the other hand, in a case where the amount of shift S is less than 0.7, the amount of shift of the image forming panel 14 does not become extremely larger than that in the case where the amount is equal to or greater than 0.7. Thus, an increase in size of the lens system is suppressed, thereby preventing deterioration of manufacturing suitability. Therefore, by setting the amount of shift S of the image forming panel 14 within the above range, it is possible to provide a product having high performance while reducing the effect of the temperature distribution in the vertical direction of the projection lens 15. It is more preferable that the amount of shift S of the image forming panel 14 is greater than 0.45 and less than 0.6.

As shown in FIG. 3, the projection lens 15 comprises a lens barrel 36 that holds first to fifth lenses L1 to L5 and an aperture stop 35 arranged in order from the image forming panel 14. The first lens L1 has convex surfaces on both sides, and the second lens L2 has a concave surface on a screen 20 side and has a convex surface on a side of the image forming panel 14. The third lens L3 has convex surfaces on both sides, and the fourth lens L4 has a convex surface on the screen 20 side and has a planar surface on the side of the image forming panel 14. The fifth lens L5 has an aspheric surface convex on the screen 20 side and has a planar surface on the side of the image forming panel 14.

The lens barrel 36 is configured such that a plurality of lens holding frames 36a to 36d and spacers 36e are fit therein, and holds the first to fifth lenses L1 to L5. The lens holding frames 36a to 36d and the spacers 36e have complicated cross-sectional shapes, and are thus formed of synthetic resin such as polycarbonate. It should be noted that some or all of the lens holding frames 36a to 36d and the spacers 36e may be made of metal.

The lens holding frame 36a is a cylinder having an outer diameter smaller than that of the other lens holding frames 36b to 36d, and is disposed on a side closer to the image forming panel 14 than the lens holding frames 36b to 36d, inside the lens barrel 36. It should be noted that the cylinder described herein is not limited to a cylinder of which the inner diameter and the outer diameter are uniform, but includes a cylinder having a substantially cylindrical shape. The lens holding frame 36a holds the first to forth lenses L1 to L4.

The aperture stop 35 is disposed integrally with the lens holding frame 36a between the fourth lens L4 and the fifth lens L5. The aperture stop 35 is made of aluminum or another metal, and is formed in an annular shape having a circular opening 35a which determines the F number. A black layer is formed on the surface of the aperture stop 35 through coating or plating.

In FIG. 3, the passage path of the light, which passes the respective positions of the image forming panel 14, in the projection lens 15 is schematically indicated by a solid line, and the center of the light is indicated by the chain line.

In a case where the image forming panel 14 is disposed to be shifted downward with respect to the optical axis L of the projection lens 15, the light, which is incident into the projection lens 15, passes mostly through the lower side with respect to the optical axis L of the projection lens 15, that is, in a direction in which the image forming panel 14 within the projection lens 15 is shifted, to the position of the stop within the projection lens 15. Then, the passage path of the light is reversed at the position of the stop, and the light passes mostly through the upper side of the projection lens 15, and is projected onto the screen 20. Accordingly, in a case where the image forming panel 14 is shifted downward, mainly a lower side part of the projection lens 15 is heated by passage of light, and temperature distribution occurs in the projection lens 15 in a direction perpendicular to the optical axis.

In a case where a temperature difference thereof is large, the lens barrel 36, which holds the first to fifth lenses L1 to L5, is also deformed by heating on only one side thereof. Due to the deformation, the first to fifth lenses L1 to L5 are tilted, and the quality of the image projected onto the screen deteriorates. Furthermore, the rotational symmetry of the first to fifth lenses L1 to L5 is destroyed by the tilt of the first to fifth lenses L1 to L5. Therefore, not only deterioration in resolving power of the entire projected image but also deviation in focus position in the diagonal direction due to occurrence of the field curvature and the like occur. This leads to deterioration in performance of the entire projected image.

In order to suppress thermal deformation generated in a case where the image forming panel 14 is disposed to be shifted with respect to the optical axis L, the lens holding frame 36a has a heat pipe structure, and thereby has a function of cooling a first part 36f (refer to FIG. 4) on a side to which the image forming panel 14 is shifted with respect to the optical axis L of the projection lens 15 and heating a second part 36g (refer to FIG. 4) on a side opposite to the side to which the image forming panel 14 is shifted with respect to the optical axis L of the projection lens 15.

Figure 4:
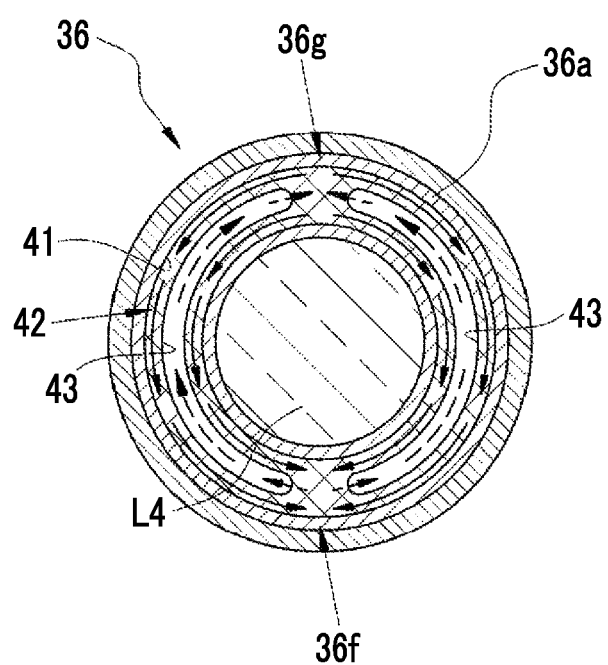
FIG. 4 is a cross-sectional view taken by the line IV-IV in FIG. 3.

As shown in FIG. 4, the lens holding frame 36a has a hollow structure 41 that defines a cavity of the inside thereof. The hollow structure 41 is installed in the first part 36f and the second part 36g, and is a hollow cylinder which is provided concentrically with the outer periphery and the inner periphery of the lens holding frame 36a.

The hollow structure 41 has a porous layer 42 on its inside (cavity), and a heat storage medium is filled and sealed therein. For example, a liquid such as water is used as the heat storage medium in terms of corrosion resistance, viscosity, and the like. The porous layer 42 is formed of, for example, a sponge, porous ceramics, or the like. In the porous layer 42, a passage 43, through which the liquid and gas of the heat storage medium are guided, is formed. The passage 43 is formed in an arc shape connecting the first part 36f and the second part 36g.

The heat storage medium is absorbed by the porous layer 42, and flows due to the temperature difference in the circumferential direction of the lens holding frame 36a. Specifically, in a case where the first part 36f is heated by the light, the heat storage medium, which absorbs this heat, evaporates, and gas of the heat storage medium moves through the inside of the hollow structure 41, mainly, the passage 43, to the second part 36g (a direction of the movement indicated by the dotted line in FIG. 4). The gas of the heat storage medium, which is cooled by the second part 36g, is aggregated so as to return to liquid, and is absorbed by the porous layer 42. The heat storage medium is pushed out by an amount of the medium aggregated in the second part 36g, and moves toward the first part 36f through the porous layer 42 (direction of movement indicated by the solid line in FIG. 4). In such a manner, the heat storage medium circulates inside the hollow structure 41, and the heat storage medium, which absorbs the heat of the first part 36f so as to cool the first part 36f, moves toward the second part 36g, thereby heating the second part 36g. It is preferable that the first part 36f, which is cooled by the heat storage medium circulating inside the hollow structure 41, and the second part 36g, which is heated by the heat storage medium, are closer to the image forming panel 14 than the position of the aperture stop 35.

As described above, in the lens holding frame 36a, the heat storage medium filled in the hollow structure 41 circulates inside the hollow structure 41, due to the temperature difference between the first part 36f and the second part 36g. Therefore, the first part 36f is cooled, and the second part 36g is heated. Thereby, the temperature distribution becomes uniform in the circumferential direction of the lens barrel 36, and deformation of a part of the lens barrel 36 caused by uneven temperature distribution is suppressed. In particular, it is possible to reduce the temperature difference between the lower side of the lens barrel 36, of which the temperature is raised through the passage of light, and the upper side as the opposite side. As a result, the first to fifth lenses L1 to L5 within the projection lens 15 are prevented from being tilted. Furthermore, since the heat storage medium circulates due to a temperature difference, a liquid circulation device or the like is not necessary outside the lens barrel 36, and it is possible to prevent an increase in size of the projector.

In the first embodiment, the gas of the heat storage medium is moved through the passage 43, and the liquid of the heat storage medium is moved through the porous layer 42, whereby the heat storage medium is circulated in the hollow structure 41. The present invention is not limited to this embodiment and the liquid alone or a mixture of the gas and the liquid may be circulated between the passage 43 and the porous layer 42.

Second Embodiment

Figure 5:
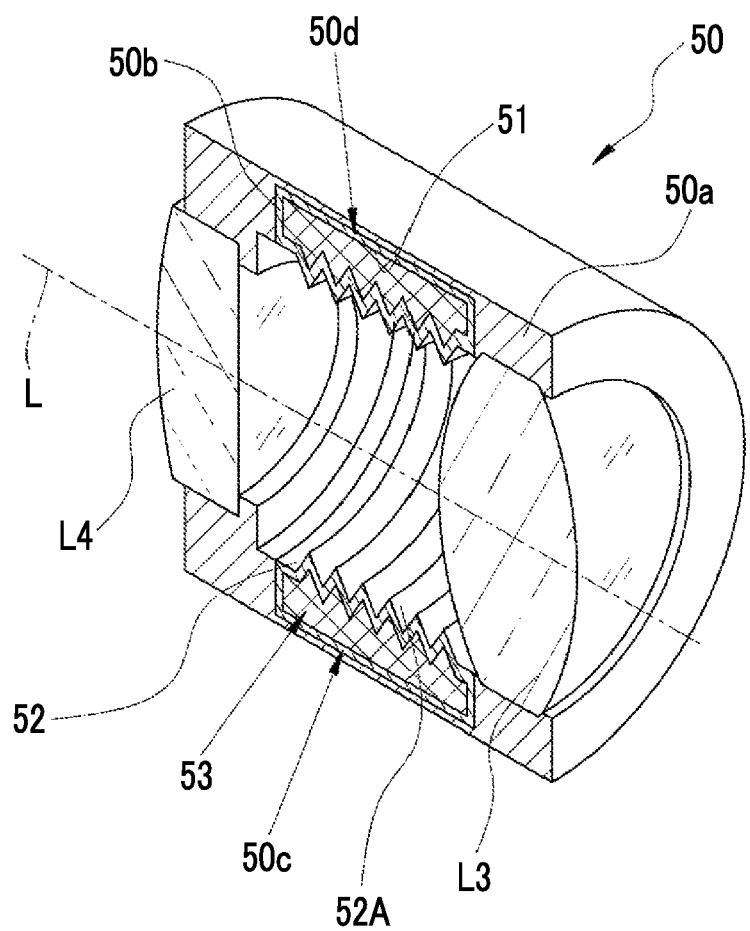
FIG. 5 is a cross-sectional perspective view of a part of a lens holding frame and a lens of the second embodiment.

As shown in FIG. 5, the lens holding frame 50 of the second embodiment has a light shielding groove 52A in addition to the heat pipe structure. In a manner similar to that of the lens holding frame 36a of the first embodiment, the lens holding frame 50 constitutes the lens barrel 36 of the projection lens 15. In a manner similar to that of the lens holding frame 36a, the lens holding frame 50 is a cylinder having a smaller outer diameter than the lens holding frames 36b to 36d, and is disposed inside the lens barrel 36.

In the lens holding frame 50, a body section 50a that holds a lens, a pipe section 50b that is positioned inside the body section 50a, and the aperture stop 35 are integrally provided. The body section 50a is formed of synthetic resin such as polycarbonate. The pipe section 50b is formed of metal such as brass, for example. In a manner similar to that of the lens holding frame 36a of the first embodiment, a hollow structure 51 is provided in the pipe section 50b. The hollow structure 51 is provided with a first part 50c on the side, to which the image forming panel 14 is shifted with respect to the optical axis L of the projection lens 15, and a second part 50d on a side opposite to the side to which the image forming panel 14 is shifted with respect to the optical axis L of the projection lens 15.

The pipe section 50b has the light shielding groove 52A on a side surface 52 of the hollow structure 51 close to the optical axis L. The hollow structure 51 and the light shielding groove 52A are positioned between the lenses, for example, between the lenses L3 and L4. In FIG. 5, the lenses L3 and L4 are shown, and the lenses L1 and L2 are omitted. The light shielding groove 52A has a concave-convex shape in cross section which is parallel to the optical axis L, and is formed in, for example, a shape of screw threads with equal intervals. Thereby, the light shielding groove 52A prevents internal reflection of the lens holding frame 50.

A porous layer 53, which is formed in a manner similar to that of the porous layer 42 of the first embodiment, is provided on the inside (cavity) of the hollow structure 51, and the heat storage medium is filled and sealed therein. In a manner similar to that of the porous layer 42, a passage (not shown in the drawing), through which the liquid and the gas of the heat storage medium are guided, is formed in the porous layer 53.

The heat storage medium is absorbed by the porous layer 53, and flows due to the temperature difference in the circumferential direction of the lens holding frame 50, and circulates inside the hollow structure 51. The heat storage medium, which absorbs the heat of the first part 50c so as to cool the first part 50c, moves toward the second part 50d, and heats the second part 50d. Further, since the lens holding frame 50 has the light shielding groove 52A, it is possible to suppress the increase in temperature of the entire lens holding frame 50, and it is possible to further reduce the temperature difference between the first part 50c and the second part 50d.

In the second embodiment, the light shielding groove 52A having a concave-convex cross-sectional shape, which is parallel to the optical axis L, is formed on the side surface 52 of the hollow structure 51 close to the optical axis L. However, the present invention is not limited to this, and a light shielding groove having a concave-convex shape in cross section, which is orthogonal to the optical axis L, may be formed on the side surface 52.

Third Embodiment

Figure 6:
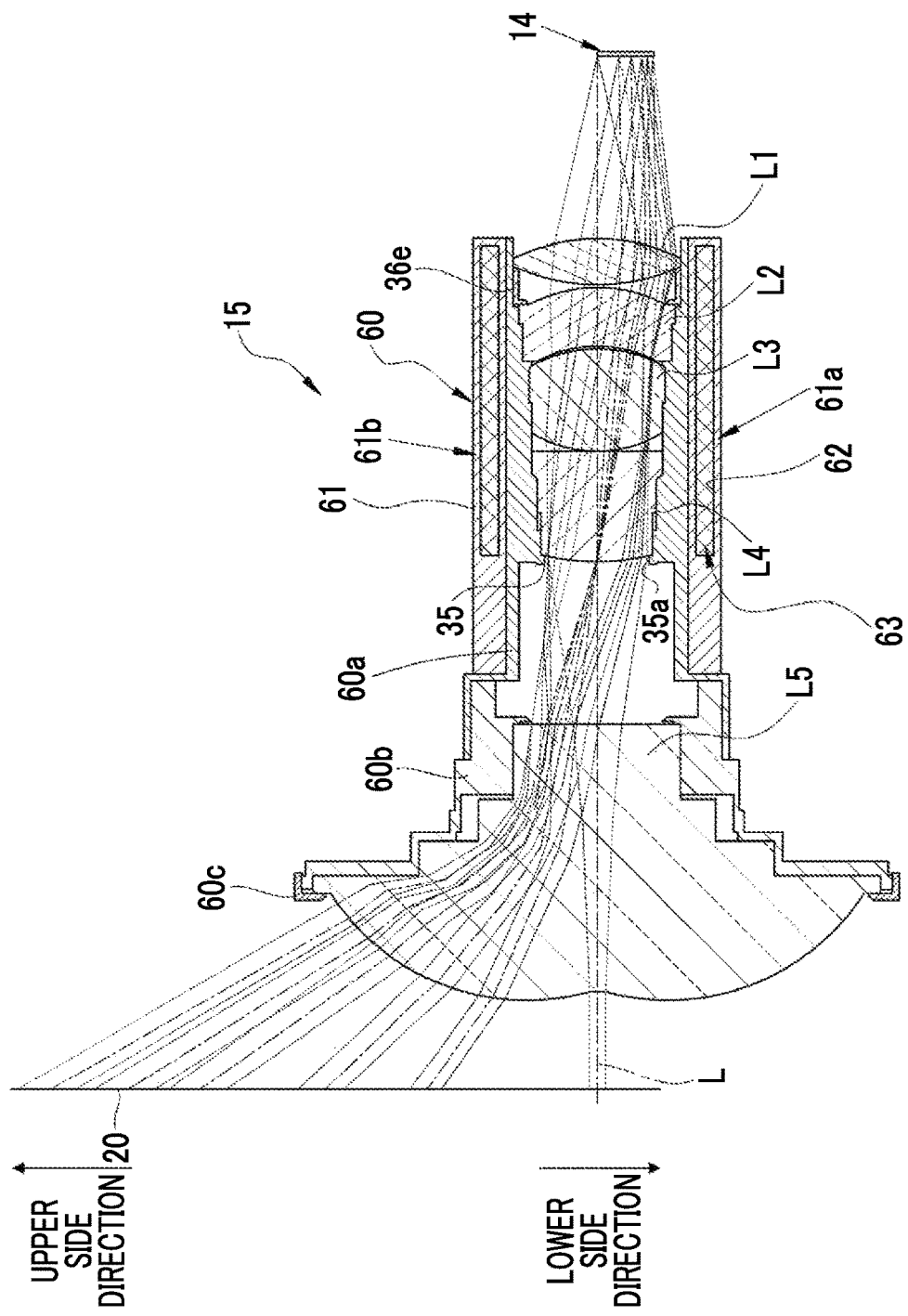
FIG. 6 is a vertical cross-sectional view illustrating a projection lens of a third embodiment.

In the first and second embodiments, the lens holding frame having the heat pipe structure is disposed inside the lens barrel 36. However, in the third embodiment, as shown in FIG. 6, a cylinder 61, which is a component separated from the lens holding frame, is provided in a lens barrel 60. In the third embodiment, the same parts and members as those of the first and second embodiments are denoted by the same reference numerals, and the description thereof is omitted, and the differences from the first embodiment will be mainly described.

The lens barrel 60 has lens holding frames 60a to 60c and a cylinder 61 fitted into the outer periphery of the lens holding frame 60a. The lens holding frames 60a to 60c and the cylinder 61 are formed of synthetic resin such as polycarbonate. The lens holding frame 60a holds the first to fourth lens L1 to L4. Further, the aperture stop 35 is disposed integrally with the lens holding frame 60a.

The cylinder 61 has the same heat pipe structure as the lens holding frames 36a and 50 of the first and second embodiments, and has a hollow structure 62 provided therein. The hollow structure 62 has a first part 61a on the side to which the image forming panel 14 is shifted with respect to the optical axis L of the projection lens 15, and a second part 61b on a side opposite to the side to which the image forming panel 14 is shifted with respect to the optical axis L of the projection lens 15, and is a hollow cylinder that is provided concentrically with the outer periphery and the inner periphery of the cylinder 61.

A porous layer 63, which is formed in a manner similar to those of the porous layers 42 and 53 of the first and second embodiments, is provided on the inside (cavity) of the hollow structure 62, and the heat storage medium is filled and sealed therein. In a manner similar to that of the porous layers 42 and 53, a passage (not shown in the drawing), through which the liquid and the gas of the heat storage medium are guided, is formed in the porous layer 63.

The heat storage medium is absorbed by the porous layer 63, and flows due to the temperature difference in the circumferential direction of the cylinder 61, and the heat storage medium circulates inside the hollow structure 62. The heat storage medium, which absorbs the heat of the first part 61a so as to cool the first part 61a, moves toward the second part 61b, and heats the second part 61b. In particular, in a case where the projection lens 15 and the light source 13 are close to each other, a temperature of the outer peripheral surface of the lens barrel 60 tends to increase. However, in the present embodiment, since the cylinder 61 constitutes the outer peripheral surface of the lens barrel 60, the temperature distribution in the circumferential direction is made to be uniform, and the deformation of a part of the lens barrel 60 caused by uneven temperature distribution is suppressed. In addition, it is preferable that, in a manner similar to the first and second embodiments, the first part 61a cooled and the second part 61b heated by the heat storage medium circulating inside the hollow structure 62 are located to be closer to the image forming panel 14 than the position of the aperture stop 35.

The first to third embodiments can be appropriately combined. For example, a heat pipe structure may be provided in both the lens holding frame, which is located inside the lens barrel, and the cylinder which constitutes the outer peripheral surface of the lens barrel.

In each of the above-mentioned embodiments, the description has been given with reference to the example in the state where the projector is installed on a board such as a table. However, the present invention is not limited to this, and the projector of the present invention may be used to be suspended from the ceiling. In this case, all the expressions such as "upper side", "lower side", "upward", "downward", and the like described in each of the above-mentioned embodiments are reversed in the vertical direction.

In each of the above-mentioned embodiments, the example, in which the image is projected onto the screen, has been described. However, the projection surface is not limited to the screen, and a projector, which projects on various projection surfaces, may be used.

EXPLANATION OF REFERENCES

10: projector
11: casing
13: light source
14: image forming panel
14a: image forming surface
15: projection lens
17: control section
20: screen
21: zoom dial
22: light amount adjustment dial
23: focus dial
24: vertical focus adjustment dial
25: horizontal focus adjustment dial
26: screen adjustment dial
31B: blue (B) LED
31G: green (G) LED
31R: red (R) LED
32, 33: dichroic mirror
35: aperture stop
35a: circular opening that defines F number
36, 60: lens barrel
36a to 36d, 50, 60a to 60c: lens holding frame
36e: spacer
36f, 50c, 61a: first part
36g, 50d, 61b: second part
41, 51, 62: hollow structure
42, 53, 63: porous layer
43: passage
50a: body section
50b: pipe section
52: side surface
52A: light shielding groove
61: cylinder
L: optical axis
L1 to L5: first to fifth lenses

What is claimed is:
1. A projector comprising:
a projection lens that has a lens and a lens barrel holding the lens;
an image forming panel that is disposed such that a center thereof is shifted with respect to an optical axis of the projection lens and that forms an image;
a light source that irradiates the image forming panel with light;
a hollow structure that makes a first part and a second part of the lens barrel communicate with each other, where the first part is a part of the lens barrel on a side to which the image forming panel is shifted with respect to the optical axis of the projection lens, and the second part is a part of the lens barrel on a side opposite to the first part in the optical axis of the projection lens; and a heat storage medium that is filled and sealed in the hollow structure.

2. The projector according to claim 1, wherein a shape of the side surface of the hollow structure close to the optical axis in a cross section, which is parallel to the optical axis, has a concave-convex shape.

3. The projector according to claim 2, wherein a porous layer is provided inside the hollow structure.

4. The projector according to claim 3, further comprising a cylinder provided at the lens barrel, wherein the hollow structure is formed inside the cylinder.

5. The projector according to claim 2, further comprising a cylinder provided at the lens barrel, wherein the hollow structure is formed inside the cylinder.

6. The projector according to claim 5, wherein the cylinder is disposed inside the lens barrel.

7. The projector according to claim 1, wherein a shape of the side surface of the hollow structure close to the optical axis in a cross section, which is orthogonal to the optical axis, has a concave-convex shape.

8. The projector according to claim 7, wherein a porous layer is provided inside the hollow structure.

9. The projector according to claim 8, further comprising a cylinder provided at the lens barrel, wherein the hollow structure is formed inside the cylinder.

10. The projector according to claim 7, further comprising a cylinder provided at the lens barrel, wherein the hollow structure is formed inside the cylinder.

11. The projector according to claim 10, wherein the cylinder is disposed inside the lens barrel.

12. The projector according to claim 1, wherein a porous layer is provided inside the hollow structure.

13. The projector according to claim 12, further comprising a cylinder provided at the lens barrel, wherein the hollow structure is font led inside the cylinder.

14. The projector according to claim 13, wherein the cylinder is disposed inside the lens barrel.

15. The projector according to claim 1, further comprising a cylinder provided at the lens barrel, wherein the hollow structure is formed inside the cylinder.

16. The projector according to claim 15, wherein the cylinder is disposed inside the lens barrel.

17. The projector according to claim 1, wherein the lens barrel is made of synthetic resin.

18. The projector according to claim 1, wherein the first part and the second part are located to be closer to the image forming panel than a position of a stop which determines an F number of the projection lens.

19. The projector according to claim 1, wherein in a case where a distance from the optical axis to a center of the image forming panel is Y, a length of the image forming panel in a direction of shift is H, and an amount of shift of the image forming panel, which is obtained by dividing the distance Y by the length H, is set as S=Y/H, the amount of shift S is in a range of $0.4<S<0.7$.

20. The projector according to claim 1, wherein a direction of shift of the image forming panel with respect to the optical axis of the projection lens is a direction of gravity on the basis of the optical axis.

* * * * *